United States Patent
Klein et al.

(10) Patent No.: US 8,330,736 B2
(45) Date of Patent: Dec. 11, 2012

(54) OPTICAL OVERLAY FOR AN ELECTRONIC DISPLAY

(75) Inventors: Jared S. Klein, Shawnee, KS (US); Andrew C. Rudebusch, Olathe, KS (US); Laura A. Rippel, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 492 days.

(21) Appl. No.: 12/621,627

(22) Filed: Nov. 19, 2009

(65) Prior Publication Data

US 2011/0115720 A1 May 19, 2011

(51) Int. Cl.
G06F 3/041 (2006.01)
G02B 27/00 (2006.01)
(52) U.S. Cl. ........................................ 345/173; 359/613
(58) Field of Classification Search ................ None
See application file for complete search history.

(56) References Cited

U.S. PATENT DOCUMENTS

| | | | |
|---|---|---|---|
| 4,751,379 A | 6/1988 | Sasaki et al. | 250/221 |
| 5,162,783 A | 11/1992 | Moreno | 340/712 |
| 6,677,934 B1 | 1/2004 | Blanchard | 345/175 |
| 7,099,553 B1 * | 8/2006 | Graham et al. | 385/146 |
| 7,429,706 B2 * | 9/2008 | Ho | 178/18.01 |
| 2009/0180189 A1 * | 7/2009 | Lee | 359/601 |

OTHER PUBLICATIONS

Infrared Technology Fundamentals, Irving Spiro and Monroe Schlessinger, pp. 140-150, published 1989.

* cited by examiner

*Primary Examiner* — Joseph Haley
*Assistant Examiner* — Nicholas Lee
(74) *Attorney, Agent, or Firm* — Samuel M. Korte; Mohammad M. Ali

(57) ABSTRACT

An optical overlay filters radiation striking the overlays at a non-planar incidence angle while passing and focusing in-plane signals. In embodiments, an optical overlay comprises an inner wall, an outer wall, an upper wall, and a lower wall. The inner wall may be formed to include a planar surface. The outer wall may be spaced apart from the inner wall and may be formed to include a convex surface. The combination of the planar surface of the inner wall and the convex surface of the outer wall may form a plano-convex lens. The upper wall may include a first plurality of ridges that are generally parallel to the inner wall. The lower wall may include a second plurality of ridges that are generally parallel to the inner wall. The combination of the first plurality of ridges and the second plurality of ridges may form an optical filter.

16 Claims, 7 Drawing Sheets

TABLE 1

| Propagation angle α | Original (clear) | Heavy matte | 45°-45° saw tooth | 10°-70° saw tooth | 20°-70° saw tooth | 25°-70° saw tooth | 30°-70° saw tooth | 45°-70° saw tooth | 10°-60° saw tooth | 20°-60° saw tooth | 20°-70° modified saw tooth | 20°-70° modified saw tooth, large channel | 20°-70° modified saw tooth, short channel |
|---|---|---|---|---|---|---|---|---|---|---|---|---|---|
| 10° | 102961 | 151991 | 89637 | 88099 | 81365 | 81926 | 78344 | 78114 | 87926 | 84129 | 57068 | 54228 | 51413 |
| 30° | 54224 | 57371 | 46286 | 3596 | 6669 | 9277 | 13542 | 33449 | 8085 | 13400 | 1702 | 3161 | 5098 |
| 45° | 35877 | 41745 | 11075 | 4063 | 3379 | 4412 | 5314 | 10721 | 2314 | 1230 | 5252 | 1176 | 1290 |
| 60° | 22151 | 28693 | 2252 | 4822 | 2525 | 3222 | 2279 | 4350 | 969 | 1938 | 909 | 1543 | 1274 |
| Total | 215213 | 279800 | 149250 | 100580 | 93938 | 98837 | 99479 | 126634 | 99294 | 100697 | 64931 | 60108 | 59075 |

Fig. 10.

TABLE 2

| Propagation angle α | Original (clear) | Heavy matte | 45°-45° saw tooth | 10°-70° saw tooth | 20°-70° saw tooth | 25°-70° saw tooth | 30°-70° saw tooth | 45°-70° saw tooth | 10°-60° saw tooth | 20°-60° saw tooth | 20°-70° modified saw tooth | 20°-70° modified saw tooth, large channel | 20°-70° modified saw tooth, short channel |
|---|---|---|---|---|---|---|---|---|---|---|---|---|---|
| 10° | 9330 | 7519 | 7240 | 6354 | 6369 | 6122 | 6182 | 7248 | 7062 | 6785 | 1931 | 1849 | 1689 |
| 30° | 3316 | 994 | 4484 | 48 | 51 | 74 | 126 | 347 | 533 | 824 | 94 | 32 | 236 |
| 45° | 56 | 871 | 2438 | 99 | 30 | 123 | 124 | 162 | 76 | 30 | 250 | 23 | 38 |
| 60° | 0 | 718 | 461 | 74 | 30 | 200 | 341 | 264 | 44 | 162 | 44 | 36 | 32 |
| Total | 12702 | 10102 | 14623 | 6575 | 6480 | 6519 | 6773 | 8021 | 7715 | 7801 | 2319 | 1940 | 1995 |

Fig. 11.

OPTICAL OVERLAY FOR AN ELECTRONIC DISPLAY

BACKGROUND

Embodiments of the present invention relate to optical overlays that filter radiation striking the overlays at a nonplanar incidence angle while passing and focusing in-plane signals.

Touch screen systems typically include an electronic display with a screen that presents information to a user. The user may respond to questions or prompts from the system by touching or physically contacting a portion of the screen. Touch screen systems are often implemented with a series of transmitters that are positioned on the opposite side of the screen from a series of receivers. The transmitters transmit infrared signals that are received by the receivers. Touching of the screen interrupts one or more of the signals which may be used to determine the location in which the screen was touched.

SUMMARY

Embodiments of the present invention relate to an optical overlay broadly comprising an inner wall, an outer wall, an upper wall, and a lower wall. The inner wall may be formed to include a planar surface. The outer wall may be spaced apart from the inner wall and may be formed to include a convex surface. The combination of the planar surface of the inner wall and the convex surface of the outer wall may form a plano-convex lens. The upper wall may include a first plurality of ridges that are generally parallel to the inner wall. The lower wall may include a second plurality of ridges that are generally parallel to the inner wall. The combination of the first plurality of ridges and the second plurality of ridges may form an optical filter.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 10 is a listing of Table 1 including simulation results of rays entering the optical overlay and striking an outer wall of the overlay;

FIG. 11 is a listing of Table 2 including simulation results of rays entering the optical overlay and striking the receiver adjacent to the overlay.

Figure 1:
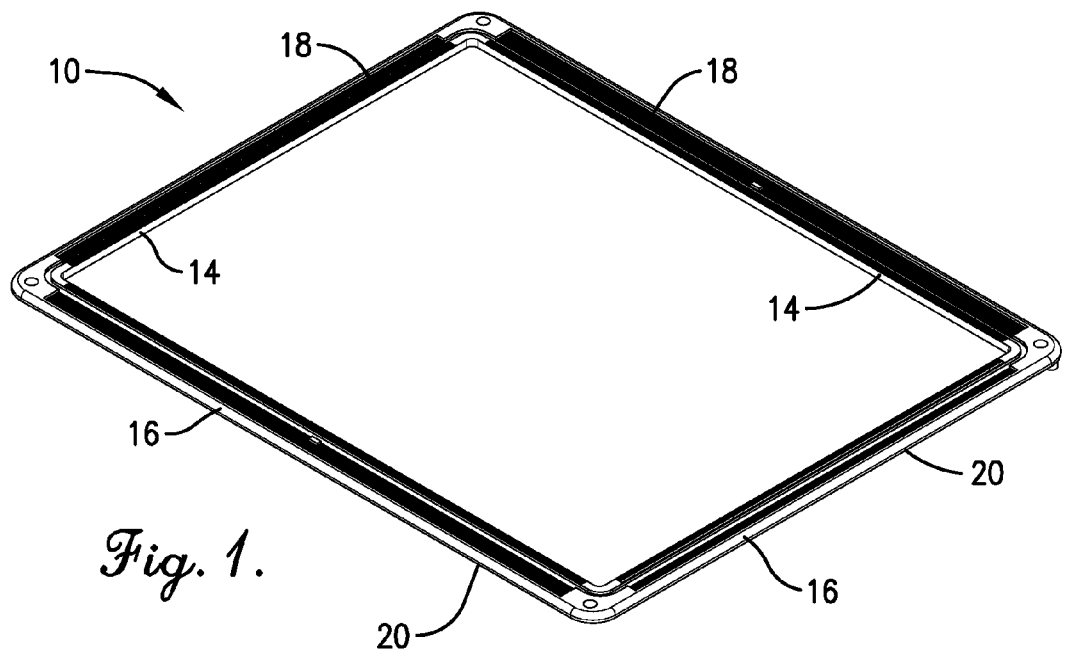
FIG. 1 is a perspective view of an optical overlay constructed in accordance with various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Various embodiments of the present invention may include an optical overlay configured to filter radiation striking the optical overlay at a non-zero incidence angle while passing and focusing in-plane signals. The optical overlay may comprise a four-sided ring of material wherein each side includes an inner wall, an outer wall, an upper wall, and a lower wall. The inner wall may be formed to include a planar surface. The outer wall may be spaced apart from the inner wall and may be formed to include a convex surface. The combination of the planar surface of the inner wall and the convex surface of the outer wall may form a plano-convex lens. The upper wall may include a first plurality of ridges that are generally parallel to the inner wall. The lower wall may include a second plurality of ridges that are generally parallel to the inner wall. The combination of the first plurality of ridges and the second plurality of ridges may form an optical filter.

The optical module may be utilized in an electronic display system with touch detection ability that may include an electronic display, wherein a user interacts with the system by touching or physically contacting the display or areas in proximity to the display. One approach to determining the touch position on the display that the user makes contact involves the use of infrared (IR) transmitters and receivers. A plurality of IR transmitters are positioned along one or more sides of the display. A plurality of IR receivers is positioned along the opposing sides of the display, generally in direct alignment with the IR transmitters, such that a single transmitter is aligned with a single receiver. During operation, each transmitter transmits an IR signal that is received by its corresponding receiver(s). Thus, an XY grid of beams is created close to the surface of the display. When the user touches the display, a portion of the beams is broken. As a result, the receivers on one or more sides of the display no longer receive the transmitted signals. The system may use the location of the inactive receivers to determine the coordinates of the point of display contact.

In various system implementations, the receivers are located along the perimeter of the display at the inner edge of the bezel and may be undesirably exposed to IR radiation from sources other than the IR transmitters. For example, sunlight can provide a high level of IR radiation. Thus, for electronic display systems that are utilized in environments exposed to sunlight, such as an aircraft cockpit, the receivers may receive undesirable IR radiation from the sun—particularly when the sun is low on the horizon. Accordingly, the receivers may receive a continuous IR signal even when the beam from the transmitter is broken by the user touching the display. As a result, the system may detect contact on the electronic display either intermittently or perhaps not at all. The problem may be further exacerbated in systems where the transmitters operate at a lower output power in order to conserve system energy resources.

An optical overlay 10 that may be utilized in an electronic display system 12 is shown in FIG. 1. The optical overlay 10 may have a generally four-sided ring or closed loop shape wherein each side may include an inner wall 14, an outer wall 16, an upper wall 18, and a lower wall 20. It is also within the scope of the present invention for the overlay 10 to include a perimeter with an even number of sides that is greater than four. Further, in some embodiments, the optical overlay 10 may present linear, circular, or open loop shaped configurations.

The inner wall 14 may be spaced apart from and generally parallel to the outer wall 16. The upper wall 18 and the lower wall 20 may be spaced apart from and generally parallel to one another, wherein the upper wall 18 and the lower wall 20 may both connect to the outer wall 16 and the inner wall 14. In various embodiments, the corners of the inner wall 14 and the outer wall 16 between sides may be rounded.

The optical overlay 10 may also include mounting and assembly features such as alignment tabs and pegs, holes, or the like. The optical overlay 10 may be manufactured from a polycarbonate material, such as LEXAN 121R from GENERAL ELECTRIC, and may be monolithically formed using an injection molding process. The material may be generally transparent or transmissive to visible and IR wavelengths of radiation, particularly radiation with a wavelength ranging from approximately 780 nm to approximately 1050 nm.

Figure 2:
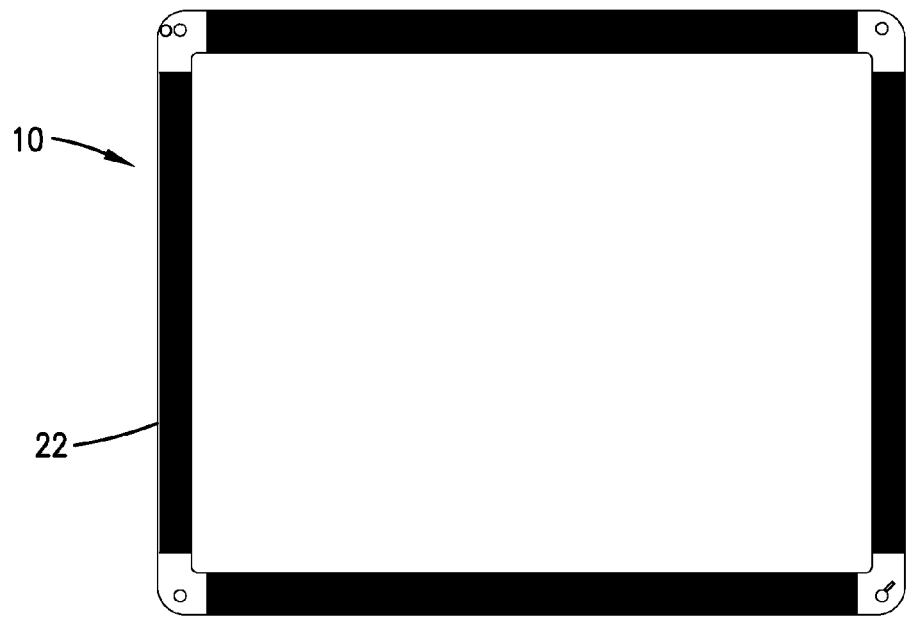
FIG. 2 is a plan view of the optical overlay.

In various embodiments, as shown in FIG. 2, portions of the outer surfaces of the upper wall 18 and the lower wall 20 may be painted or otherwise coated with a dark coating 22 that is black or nearly black and may be non-reflective matte or glossy. In other embodiments, the coating 22 may be present in the corner regions of the optical overlay 10. Additional features of the optical overlay 10 are discussed in greater detail below.

Figure 3:
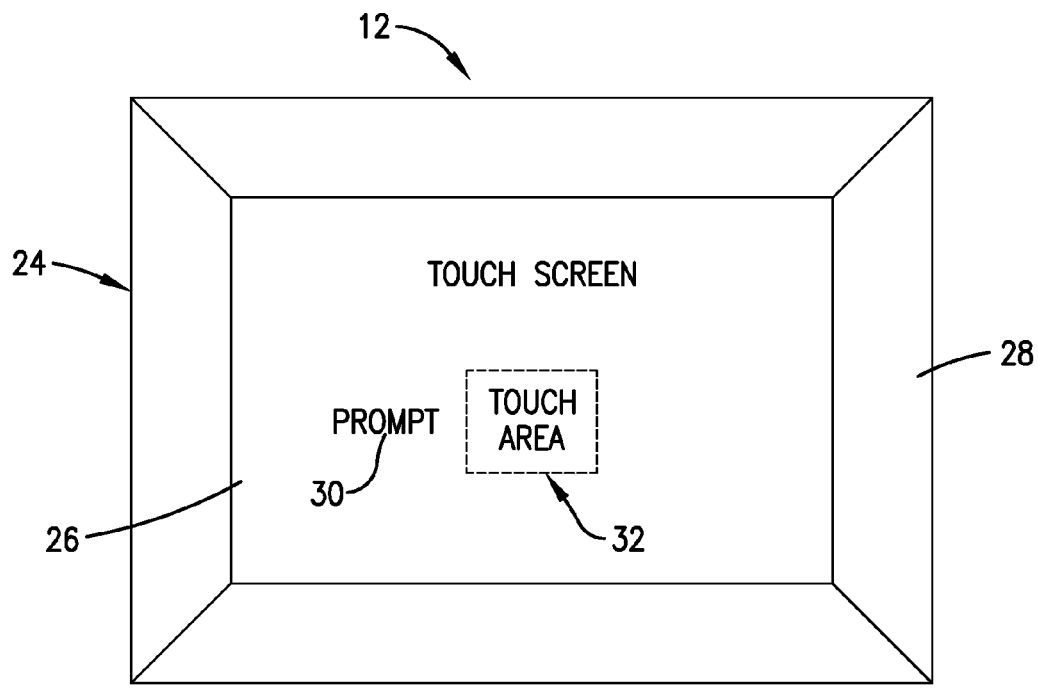
FIG. 3 is a schematic plan view of an electronic display system including an electronic display and a bezel.
Figure 4:
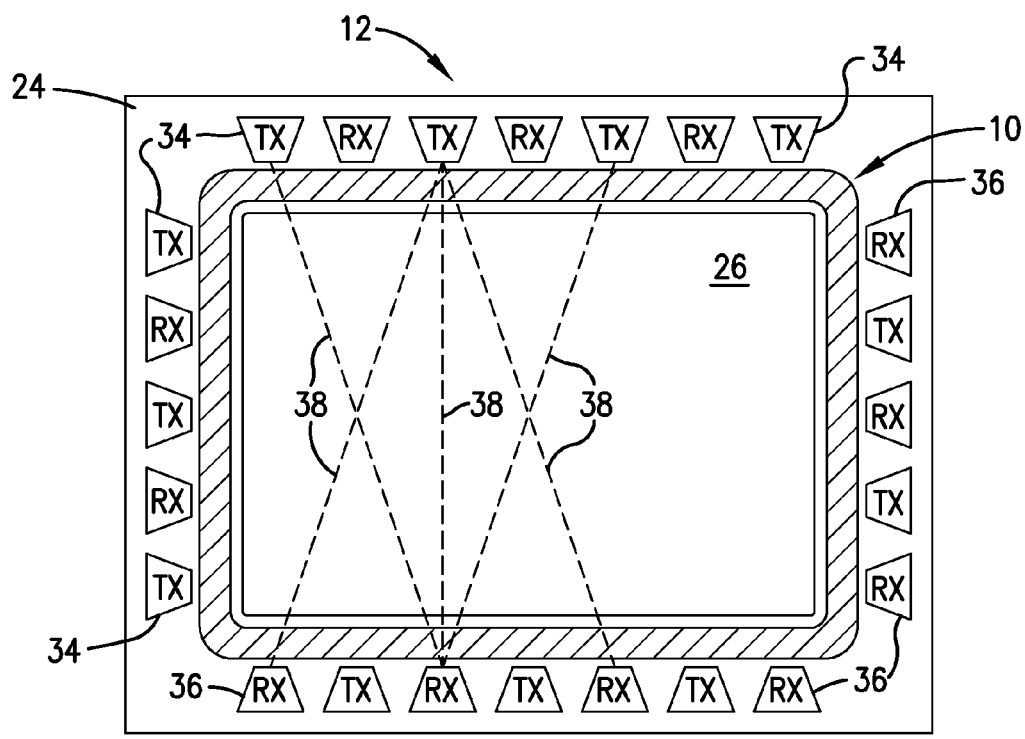
FIG. 4 is a plan view of a electronic display system with the bezel removed to reveal a plurality of transmitters, a plurality of receivers, and the optical overlay.

The electronic display system 12, shown in FIG. 3 as the user normally sees it, may include an electronic display 24 and a bezel 28. The electronic display system 12 generally provides interactive information to a user such that the user may respond to a prompt 30 or question by touching a touch area 32 located anywhere on the visible portion of the display 24. The electronic display system 12 with the bezel 28 removed is shown in FIG. 4 and may further include the optical overlay 10, a plurality of transmitters 34, and a plurality of receivers 36.

The electronic display system 12 may be an avionics-related system operable to provide various information regarding aircraft configuration and flight parameters. For example, the electronic display system 12 may include a primary flight display (PFD), a multi-function display (MFD), a multi-use avionics-system controller, an aircraft radio, an aircraft navigation panel, an aircraft instrument panel, combinations thereof, and the like. However, in some embodiments the electronic display system 12 may be any electronic display that presents information for touching by a user. The electronic display system 12 may also include components not shown in the figures, such as control elements, inputs, outputs, and communication ports. The control elements may include personal computers, laptop computers, microprocessors, microcontrollers, field-programmable gate arrays (FPGAs), application-specific integrated circuits (ASICs), combinations thereof, and the like. Inputs may include knobs, dials, switches, keypads, keyboards, mice, joysticks, combinations thereof, and the like. Outputs may include audio speakers, lights, dials, meters, printers, combinations thereof, and the like. Communication ports may be wired or wireless, electronic, optical, radio frequency (RF), combinations thereof, and the like.

The electronic display 24 may be integrated with a display cover 26 such that data sent to the electronic display 24 is displayed below the display cover in a conventional manner. The electronic display 24 may be of a variety of types, including, but not limited to, a cathode ray tube (CRT), plasma, liquid crystal display (LCD), thin film transistor (TFT) LCD, light-emitting diode (LED), organic LED (OLED), LEP (Light Emitting Polymer) or PLED (Polymer LED), combinations thereof, and the like. The viewable portion of the display 24 may be generally four-sided with a square or a rectangular aspect ratio and may be viewed in either a landscape or a portrait mode.

Figure 8:
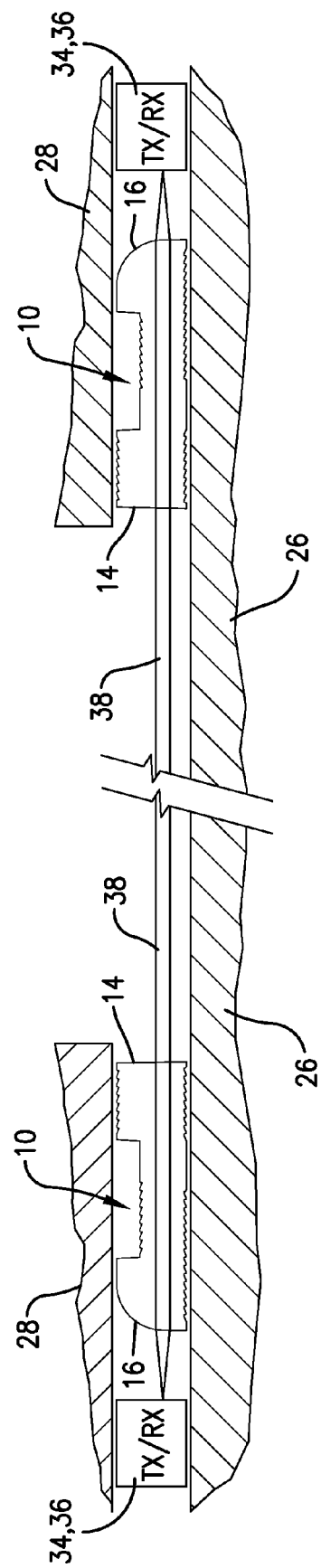
FIG. 8 is a sectional view of the electronic display system illustrating the transmitter transmitting a signal to the receiver through the optical overlay.

The bezel 28, shown in FIGS. 3 and 8, generally provides a cover for the outer perimeter of the electronic display 24 and may surround the display 24. Thus, a portion of the bezel 28 may be positioned on the front of the electronic display 24 and a portion of the bezel 28 may be positioned on the side walls of the electronic display 24. Furthermore, the shape of the bezel 28 may vary with the shape of the electronic display 24, although usually the bezel 28 extends inward a certain distance from the edges of the electronic display 24 towards the center of the display 24.

The plurality of transmitters 34 generally transmit signals 38 to be received by the plurality of receivers 36. The transmitters 34 may generate an output corresponding to an electrical or electronic signal input. In various embodiments, each transmitter 34 may transmit more than one signal 38 at a time. The transmitters 34 may include LEDs, lasers, or other devices that are capable of producing infrared radiation. In some embodiments, the transmitters 34 may produce radiations with a wavelength that may range from approximately 780 nm to approximately 1050 nm, which is generally in the IR radiation range. In some embodiments where night vision equipment may be employed to view the display 24, transmitters 34 may be configured to utilize energy centered around 940 nm to 950 nm. The transmitters 34 may be positioned on one or more sides of the display 24 at the edge of the display 24 such that the transmitting portion faces the viewable portion of the display 24. In various embodiments, the transmitters 34 may be placed on all sides of the display 24, as seen in FIG. 4.

The plurality of receivers 36 generally receive the signals 38 from the plurality of transmitters 34 and generate an electrical or electronic output corresponding to the signal 38. In various embodiments, each receiver 36 may receive a signal 38 from more than one transmitter 34 and in turn, may generate one or more outputs. The receivers 36 may include photodetectors, photocells, phototransistors, photoresistors, photodiodes, combinations thereof, or other photosensitive materials that may detect IR radiation. In some embodiments, the receivers 36 are configured for detecting radiation in the range of approximately 780 nm to approximately 1050 nm. The receivers 36 may be positioned along the edge of the display 24 generally opposite from the transmitters 34. Hence, in various embodiments, the receivers 36 may be placed on all sides of the display 24 and interposed with the transmitters 34, as shown in FIG. 4. Furthermore, in some embodiments, each receiver 36 may be substantially orthogonally positioned opposite from each transmitter 34. Given the described alignment, each transmitter 34 may transmit a signal 38 to the receiver 36 directly opposite as well as one or more receivers 36 on either side, as seen in FIG. 4. Likewise, each receiver 36 may receive a signal 38 from the transmitter 34 directly opposite as well as one or more transmitters 34 on either side. In other embodiments, the receivers 36 may be placed on all sides of the display 24 and interposed with the transmitters 34 such that each receiver 36 may be positioned opposite from another receiver 36 and each transmitter 34 may be positioned opposite from another transmitter 34. Thus, each transmitter 34 may communicate with one or more receivers 36 that are not positioned directly across from the transmitter 34. For example, the radiation transmitted by the transmitters 34 is typically cone shaped and therefore operable for reception by more than one of the receivers 36.

When properly implemented in the electronic display system 12 as shown in FIGS. 4 and 8, the optical overlay 10 may be positioned at least partially around the periphery of the display 24 and between opposing rows of transmitters 34 and receivers 36, such that the inner wall 14 of the optical overlay 10 faces the viewable portion of the display 24, while the outer wall 16 faces the transmitters 34 and the receivers 36. The lower wall 20 may be adjacent to the outer edge of the display 24 that is normally not visible or, in some embodiments, may be adjacent to a portion of the housing of the display 24. The upper wall 18 may be adjacent to a lower portion of the bezel 28 as seen in FIG. 8. Once the system 12 is assembled, the bezel 28 covers the optical overlay 10 and the transmitters 34 and the receivers 36, such that all the components outside the visible area of the display 24 are hidden by the bezel 28.

Since the optical overlay 10 is generally positioned around the edge of the display 24, the dimensions of the inner wall 14 may correspond or otherwise relate to the length and width of the display 24 including the dimensions of the viewable portion of the display 24. The dimensions of the outer wall 16, such as the distance from the inner wall 14 to the outer wall 16, may be related to the properties of the filter 44, as discussed below.

Figure 5:
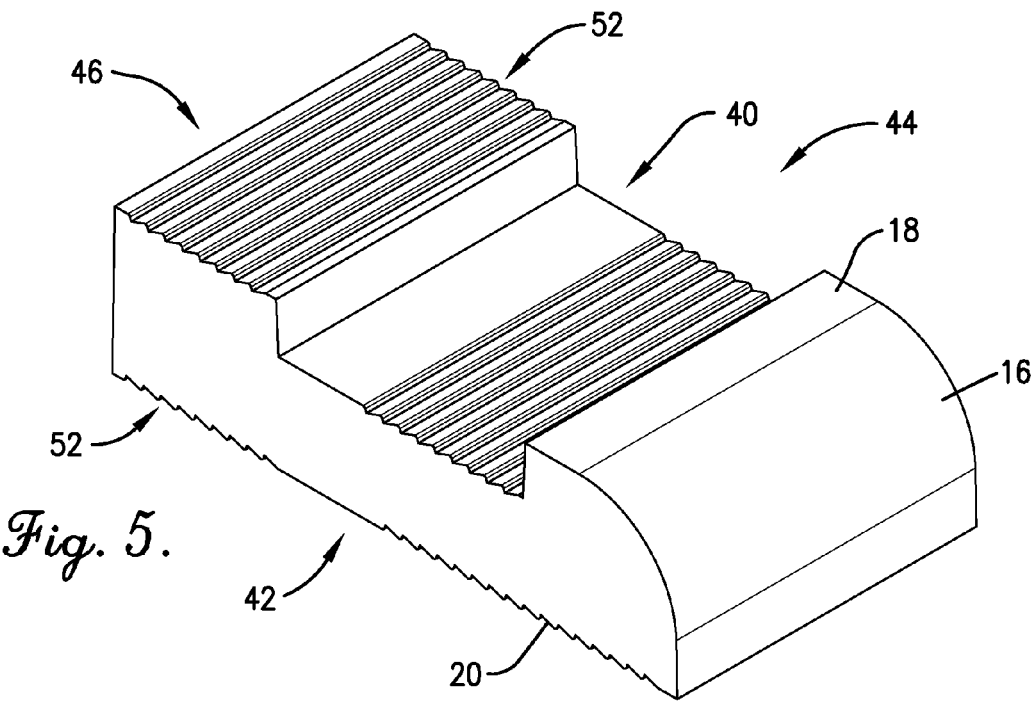
FIG. 5 is a perspective view of an optical module including a lens and a filter.
Figure 6:
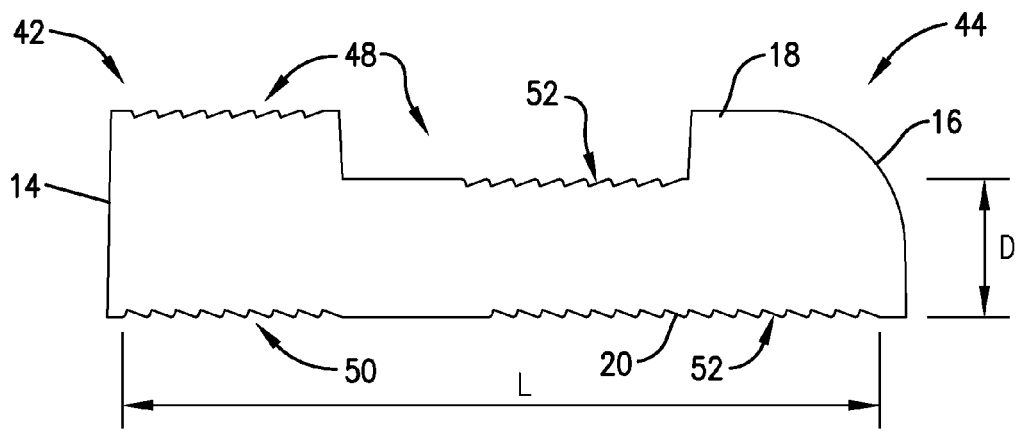
FIG. 6 is a sectional view of the optical module illustrating a planar surface and a convex surface of the lens and a plurality of ridges of the filter.

In various embodiments, a groove 40 may be formed in the optical overlay 10, as seen in FIGS. 5 and 6. The groove 40 is configured to retain a gasket for sealing or weatherproofing the display 24 and the bezel 28 of the electronic display system 12. The groove 40 may be positioned along the upper wall 18, as shown, or along the lower wall 20, or, in some embodiments, along both the upper wall 18 and the lower wall 20. The gasket may be formed from malleable or resilient material and may contact the display 24, the bezel 28, or both. The gasket and associated groove 40 provide protection for the various electrical components of the electronic display system 12 against the penetration of liquid, dust, dirt, or other possible system contaminants.

Portions of the optical overlay 10 may form or comprise a lens 42 and a filter 44. The lens 42 and the filter 44 may also form an optical module 46, as shown in FIG. 5, to perform the functions described below. The optical overlay 10 may include a plurality of optical modules 46 that are contiguously positioned and smoothly joined along the perimeter of the optical overlay 10. However, in various embodiments, the optical overlay 10 may include a plurality of discrete optical modules 46, such as the discrete portion shown in FIG. 5, that are positioned between the display 24 and the transmitters 34 and receivers 36. For example, one optical module 46 may be placed in front of each transmitter 34 and each receiver 36, such that the outer wall 16 of the module 46 faces the transmitter 34 or receiver 36 and the inner wall 14 faces the display 24. Alternative embodiments may include one optical module 46 positioned in front of the receivers 36 only.

The lens 42 may be of plano-convex type with the inner wall 14 of the optical overlay 10 forming a planar lens surface and the outer wall 16 forming a convex lens surface, as seen in FIGS. 5 and 6. In other embodiments, the inner wall 14 may be of a convex shape as well, such that the lens 42 may be of a biconvex type. Accordingly, the lens 42 may be formed around the entire perimeter of the optical overlay 10. Since the optical overlay 10 is generally positioned around the periphery of the display 24, a transmitter 34 and its corresponding receiver 36 are located on opposite sides of the optical overlay 10. Thus as illustrated in FIGS. 4 and 8, the signal 38 transmitted from a transmitter 34 passes through a first instance of the lens 42 (the outer wall 16 to the inner wall 14), travels across the surface of the display 24, and passes through a second instance of the lens 42 (the inner wall 14 to the outer wall 16) to be received by a receiver 36. As a result, in the first instance, the lens 42 may collimate the signal 38 from the transmitter 34. In the second instance, the lens 42 may focus the signal 38 onto the surface of the receiver 36.

The filter 44 generally filters non-planar radiation, typically from sources other than the transmitters 34, along the path of the optical signal 38. Accordingly, the filter 44 generally reduces the amount of radiation from other sources (such as the sun) that encounters the receivers 36. The filter 44 may be coupled with the lens 42 and may include an upper filter 48 that is formed along the upper wall 18 and a lower filter 50 formed along the lower wall 20. In some embodiments, the filter 44 may be formed around the entire perimeter excluding those portions of the upper wall 18 and the lower wall 20 in the vicinity of the corners of the optical overlay 10. In other embodiments, the filter 44 may be formed around the entire perimeter of the optical overlay 10. As shown in FIG. 6, the filter 44 may have a length L and a separation distance D between the upper filter 48 and the lower filter 50. In various embodiments, the length L of the filter 44 may range from approximately 5.59 mm to approximately 7.56 mm, and the separation distance D may be approximately 1.02 mm, but the filter 44 may have other dimensions without departing from the scope of the invention. The dimensions of length L and separation distance D may affect the performance of the filter 44, as discussed below.

The filter 44 may include a plurality of filter ridges 52 that are contiguously positioned along the upper filter 48 and the lower filter 50. The filter ridges 52 are generally in parallel with each other and generally aligned with the inner wall 14 and the outer wall 16. When the optical overlay 10 is viewed in cross section, as in FIGS. 6 and 7, the filter ridges 52 may have a general sawtooth geometry. Each filter ridge 52 may include a forward surface 54 coupled along a top edge to an opposing rear surface 56, with a slight curvature on the trailing end of the rear surface 56. In other embodiments, the trailing end of the rear surface 56 may be flat. The forward surface 54 may face the inner wall 14, while the rear surface 56 may extend toward the outer wall 16. Generally, the filter ridges 52 of the upper filter 48 are oriented to be the mirror image of the filter ridges 52 of the lower filter 50.

Figure 7:
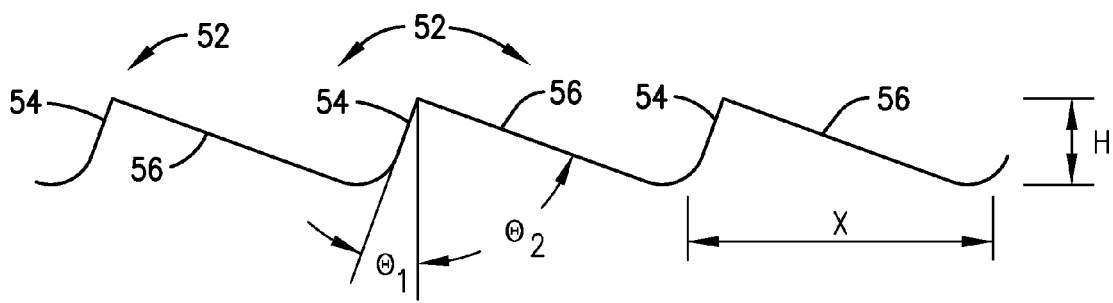
FIG. 7 is an enlarged sectional view of the filter ridges.

Each filter ridge 52 may have a height H and a pitch X, as shown in FIG. 7. In various embodiments, the height H may be approximately 51 μm, and the pitch X may be approximately 180 μm, but the filter ridges 52 may have other dimensions without departing from the scope of the invention. The forward surface 54 may be positioned at an angle θ1, while the rear surface 56 may be positioned at an angle θ2, with respect to the vertical as shown in FIG. 7. In various embodiments, angle θ1 may have a value of approximately 20°, while angle θ2 may have a value of approximately 70°. Simulations to determine various optimal values of the angles θ1 and θ2 are discussed in greater detail below.

In general, the angle θ2 may have a value greater than approximately 45°, as this serves at least several purposes. First, the angle θ2 being greater than approximately 45° may increase the likelihood that stray radiation encountering either the upper filter 48 or the lower filter 50 may be reflected toward the opposing filter. Second, a portion of the signal 38 from the transmitters 34 may not be completely or properly collimated by the lens 42. Since the filter 44 is positioned along the signal 38 path in front of the transmitters 34, as seen in FIG. 8, any non-collimated portion of the signal 38 may be reflected at a shallow angle off of one or more of the rear surfaces 56 toward the receivers 36, thereby maintaining proper performance of the touch screen system 12. A larger angle θ2 may increase the likelihood that the signal reaches the receivers 36. Third, the pitch X of each filter ridge 52 may be determined in part by angle θ2—generally, the greater the angle θ2, the greater the pitch X. A larger pitch X between the ridges 52 may make the molding and manufacturing of the optical overlay 10 easier.

The optical overlay 10 may function as follows. Signals 38 from the transmitters 34 may be collimated by the lens 42 of the outer wall 16 on one side of the overlay 10 and focused onto a receiver 36 by the lens 42 on the opposite side of the overlay 10. The signals 38 may travel in one or more planes that are roughly parallel to the upper filter 48 and the lower filter 50, as shown in FIG. 8. Thus, the signals 38 do not substantially intersect or contact the filter 44 and generally pass unimpeded through the filter 44.

Figure 9:
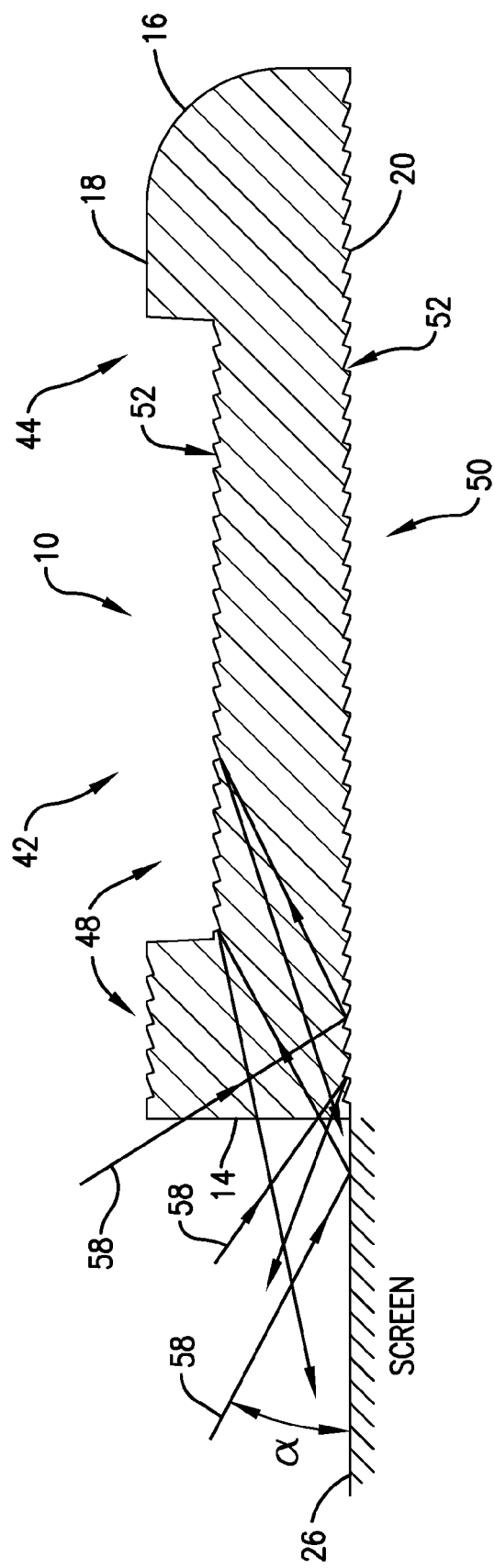
FIG. 9 is a sectional view of a display and a portion of the optical overlay illustrating a plurality of rays reflecting off of the filter ridges.

Radiation from other sources, particularly the sun, may include a plurality of rays 58 that are of a similar wavelength to the signals 38 from the transmitters 34. The rays 58 may possess a propagation angle α, which is measured with respect to the horizontal, as shown in FIG. 9, wherein the propagation angle α is generally non-zero, such that the rays 58 travel on a path that is not parallel to the upper filter 48 or the lower filter 50. Thus, the radiation may enter the optical overlay 10 through the inner wall 14 either directly or being reflected off the surface of the display 24 and may intersect the upper filter 48, the lower filter 50, or both.

The radiation that encounters the filter 44 may be reflected following the general rule of specular reflection that the angle of reflection equals the angle of incidence. When first entering the filter 44, the angle of incidence may be equal to the propagation angle α. To determine the destination of a given ray 58 after entering the filter 44, the path of the ray 58 may be traced using the rule of specular reflection for each surface of the filter 44 that the ray 58 encounters. Following this guideline, some general observations of the behavior of rays 58 that enter the filter 44 may be given as follows. Rays 58 that strike the forward surface 54 of a filter ridge 52 are typically reflected toward the inner wall 14. Rays 58 that strike the rear surface 56 may be reflected either toward the inner wall 14 or toward the outer wall 16, depending on the direction from which they originated. Those rays 58 that travel from the outer wall 16 may be reflected off the rear surface 56 of a ridge 52 toward the inner wall 14. Likewise, the rays 58 traveling from the inner wall 14 may be reflected toward the outer wall 16. In addition, rays 58 that are reflected from the lower filter 50 may strike the upper filter 48. Similarly, rays 58 that are reflected from the upper filter 48 may strike the lower filter 50. Furthermore, the rear surface 56 of the ridges 52 may be tilted at a larger angle θ2 in order to encourage rays 58 to reflect from one filter, either upper 48 or lower 50, to the opposing filter, perhaps a plurality of times.

In various embodiments, the outer surfaces of the upper wall 18 and the lower wall 20 may include the coating 22. Since the filter 44 may be formed along the upper wall 18 and the lower wall 20, the backing surface of both the upper filter 48 and the lower filter 50 may include the coating 22. As described above, the coating 22 may be of a generally dark color, such as black, and thus may absorb a portion of the rays 58 that strike the filter 44. In addition, the coating 22 may produce a diffuse reflection, as opposed to a specular reflection, that scatters the rays 58 that strike any surface of the filter 44, including the forward surface 54, the rear surface 56, the upper filter 48, and the lower filter 50. The scattered rays 58 are generally reflected in a direction away from the receivers 36. In embodiments of the optical overlay 10 that include the coating 22, some rays 58 that enter the filter 44 may be absorbed, some may be scattered in a diffuse pattern, while other rays 58 may be reflected as described above.

Rays 58 that enter the filter 44 may be reflected a plurality of times off the forward surface 54, the rear surface 56, the upper filter 48, and the lower filter 50 before they are absorbed, reflected through the inner wall 14 and out of the overlay 10, or scattered away from the receivers 36. However, a portion of the rays 58 that enter the filter 44 may encounter the receivers 36. In general, the more that the stray radiation is reflected, the less likely that it is to contact the receivers 36 and affect system 12 performance. The dimensions of the separation distance D and the length L of the filter 44 may influence the number of times that a ray 58 is reflected. Decreasing the separation distance D, increasing the length L of the filter 44, or a combination thereof is likely to increase the number of times that the stray radiation may be reflected and either exit the filter 44 or be absorbed, thereby reducing the possibility that the rays 58 strike the receivers 36.

Simulations to determine the optimal values of the angles θ1 and θ2 were performed using the software package TracePro® from Lambda Research of Littleton, Mass. The results of the simulations are in Table 1 of FIG. 10 and Table 2 of FIG. 11. The simulations involved importing a two-dimensional cross-section of the overlay 10, along with properties of the surfaces and material of the overlay 10 into the software package. Tables 1 and 2 include a plurality of columns of data, wherein each column of data includes the results of three simulations—one for each of the propagation angles α indicated in the three rows of each column. Furthermore, the heading of each column indicates the properties of the filter 44 that was simulated. For each simulation, one million rays 58 of radiation were input to the filter 44 at the propagation angle α indicated at each row. Propagation angles of 10°, 30°, 45°, and 60° were simulated. In Table 1, each result is the sum of the number of rays 58 out of one million that were measured as striking the outer wall 16 of the overlay 10—the portion of the overlay 10 that is closest to the receiver 36. In Table 2, each result is the sum of the number of rays 58 out of one million that were measured as striking various locations on the receiver 36. In addition, for Tables 1 and 2, the bottom row of each column displays the sum of the results for each filter 44 configuration.

In the first column of Tables 1 and 2, the simulations were performed with a filter 44 that includes no filter ridges 52. In other words, the upper wall 18 and the lower wall 20 were smooth with no filtering geometry and no coating 22. The simulations of the second column were performed with a filter 44 that had no filter ridges 52, but did include the coating 22. The simulations of the subsequent columns were performed with filters 44 that included filter ridge 52 geometries as shown in FIGS. 6-9. The two angles listed in each column heading refer to angles θ1 and θ2, with θ1 being listed in the first position and θ2 being listed in the second position. The results of the simulations show that rays 58 that enter the filter 44 at a shallower propagation angle α, e.g. 10°, have a greater chance of making it through the filter 44 and striking the receivers 36. Rays 58 that enter the filter 44 at a higher propagation angle α, e.g. 60°, have a smaller chance of passing through the filter 44 and striking the receivers 36. Furthermore, the last two columns of Tables 1 and 2 show that the filter 44 with θ1=20° and θ2=70° and modified sawtooth geometries with long and short channels have the smallest total number of rays 58 striking the outer wall 16 of the overlay 10 and the receivers 36. Thus, these two configurations indicate the optimal design of the filter 44.

Figure 12:
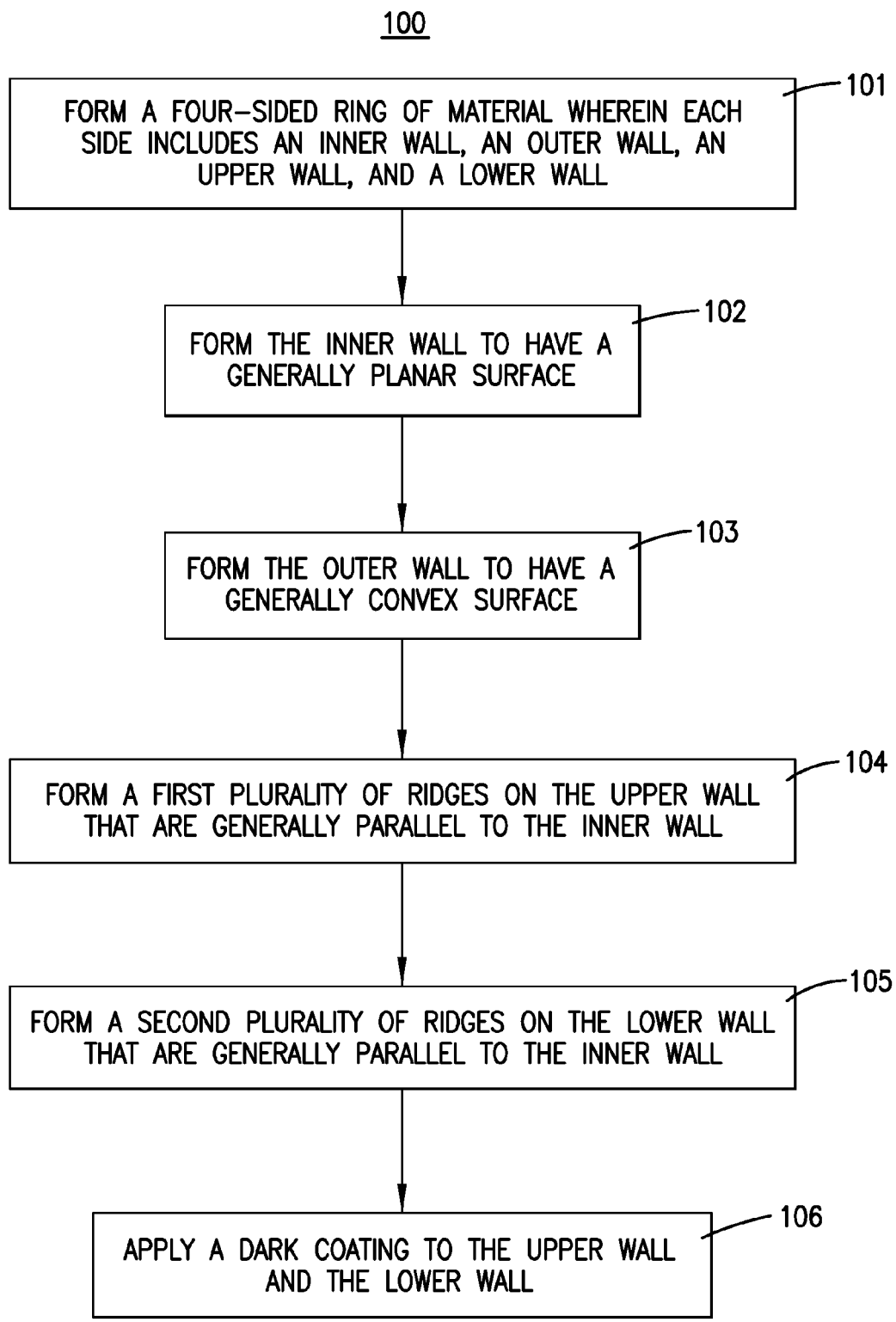
FIG. 12 is a flow diagram that lists at least a portion of the steps of an exemplary method of creating the optical overlay.

At least a portion of the steps of a method 100 for creating an optical overlay 10 is listed in FIG. 12. The steps may be performed in the order as shown in FIG. 12, or they may be performed in a different order. Furthermore, some steps may be performed concurrently as opposed to sequentially.

In connection with step 101, a four-sided ring of material is formed wherein each side includes an inner wall 14, an outer wall 16, an upper wall 18, and a lower wall 20. The inner wall 14 may be spaced apart from and generally parallel to the outer wall 16. The upper wall 18 may be spaced apart from and generally parallel to the lower wall 20. The ring may be formed such that adjacent sides are generally orthogonal to each other. The material may be generally transparent or transmissive to visible and IR wavelengths of radiation, particularly radiation with a wavelength ranging from approximately 780 nm to approximately 1050 nm.

In connection with step 102, the inner wall 14 is formed to have a generally planar surface. Accordingly, the inner wall 14 may form a planar surface of a lens 42.

In connection with step 103, the outer wall 16 is formed to have a generally convex surface. Accordingly, the outer wall 16 may form a convex surface of the lens 42. The outer wall 16 in combination with the inner wall 14 may form a plano-convex lens.

In connection with step 104, a first plurality of ridges 52 is formed on the upper wall 18 that are generally parallel to the inner wall 14. The ridges 52 may be aligned with one another and contiguously positioned. Each ridge 52 may include a forward surface 54 coupled along a top edge to an opposing rear surface 56, with a slight curvature on the trailing end of the rear surface 56. The forward surface 54 may face the inner wall 14 and may be angled at approximately 20° with respect to the vertical, while the rear surface 56 may extend toward the outer wall 16 and may be angled at approximately 70° with respect to the vertical. Both the forward surface 54 and the rear surface 56 may be reflective.

In connection with step 105, a second plurality of ridges 52 is formed on the lower wall 20 that are generally parallel to the inner wall 14. The second plurality of ridges 52 may be substantially similar to the first plurality of ridges 52, and the combination of both sets of ridges 52 may form a filter 44. The ridges 52 may be formed such that radiation which includes a plurality of rays 58 that enters the overlay 10 through the inner wall 14 with a non-zero angle of incidence may be reflected off of the forward surface 54, the rear surface 56, or both.

In connection with step 106, a dark coating 22 may be applied to the upper wall 18 and the lower wall 20. The coating 22 may provide absorption or diffuse reflection for a portion of the radiation that enters the overlay 10 through the inner wall 14 with a non-zero angle of incidence such that at least some of the rays 58 which strike the surfaces of the filter 44 may be absorbed or scattered.

Although the invention has been described with reference to the embodiments illustrated in the attached drawing figures, it is noted that equivalents may be employed and substitutions made herein without departing from the scope of the invention as recited in the claims.

What is claimed is:

1. An optical module comprising:
   a lens including a planar surface and a convex surface configured to collimate and focus an optical signal; and
   a filter coupled to the lens, including an upper wall and an opposing lower wall, each wall including a plurality of reflective elements that are angled with respect to the vertical and configured to pass the optical signal and to reflect at least some radiation traveling on a path that is not parallel to the upper wall and the lower wall;
   wherein each reflective element includes a first reflective surface coupled along a top edge to an opposing second surface, such that the first surface is configured to reflect at least some radiation toward the planar surface of the lens and the second surface is configured to reflect at least some radiation from the upper wall to the lower wall and from the lower wall to the upper wall.

2. The module of claim 1, wherein the filter further includes a coating configured to scatter and/or absorb radiation that strikes the filter.

3. The module of claim 1, wherein the filter is positioned between the planar surface and the convex surface of the lens.

4. The module of claim 1, wherein the first reflective surface is positioned at an angle of approximately twenty degrees with respect to the vertical.

5. The module of claim 1, wherein the second reflective surface is positioned at an angle of approximately seventy degrees with respect to the vertical.

6. An optical overlay comprising:
   an inner wall that extends along a four-sided perimeter;
   an outer wall spaced apart from the inner wall and extending along the four-sided perimeter;
   a lens including a planar surface formed along the inner wall and a convex surface formed along the outer wall configured to collimate and to focus an optical signal;
   an upper wall coupled to the top of the inner wall and the outer wall;
   a lower wall coupled to the bottom of the inner wall and the outer wall; and
   a filter formed along the upper wall and the lower wall and including a plurality of reflective ridges that are angled with respect to the vertical, the ridges being configured to reflect at least some radiation traveling on a path that is not parallel to the upper wall and the lower wall;
   wherein each ridge includes a first reflective surface coupled along a top edge to an opposing second surface, such that the first surface is configured to reflect at least some radiation toward the planar surface of the lens and the second surface is configured to reflect at least some radiation from the upper wall to the lower wall and from the lower wall to the upper wall.

7. The optical overlay of claim 6, further including a coating applied to the upper wall and the lower wall configured to scatter and/or absorb radiation that strikes the filter.

8. The optical overlay of claim 6, wherein the first reflective surface is positioned at an angle of approximately twenty degrees with respect to the vertical.

9. The optical overlay of claim 6, wherein the second reflective surface is positioned at an angle of approximately seventy degrees with respect to the vertical.

10. An electronic display system comprising:
   a display configured to display information;
   a plurality of transmitters positioned along at least one side of the display and configured to transmit a plurality of optical signals;
   a plurality of receivers positioned along at least one side of the display opposing the transmitters and configured to receive the optical signals; and
   an optical overlay positioned around the perimeter of the display between the transmitters and the receivers and configured to collimate and focus the optical signals and to reflect at least some radiation traveling on a path that is not parallel to the optical signal, the optical overlay including;
      an inner wall and a spaced apart outer wall that both extend along a four-sided perimeter,
      a lens with a planar surface formed along the inner wall and a convex surface formed along the outer wall,
      an upper wall coupled to the top of the inner wall and the outer wall and a lower wall coupled to the bottom of the inner wall and the outer wall, and
      a filter formed along the upper wall and the lower wall and including a plurality of reflective ridges that are angled with respect to the vertical;
   wherein each reflective ridge includes a first reflective surface coupled along a top edge to an opposing second surface, such that the first surface is configured to reflect at least some radiation toward the planar surface of the lens and the second surface is configured to reflect at least some radiation from the upper wall to the lower wall and from the lower wall to the upper wall.

11. The electronic display system of claim 10, wherein the optical overlay further includes a coating applied to the upper wall and the lower wall configured to scatter and/or absorb radiation that strikes the filter.

12. The electronic display system of claim 10, wherein the first reflective surface is positioned at an angle of approximately twenty degrees with respect to the vertical.

13. The electronic display system of claim 10, wherein the second reflective surface is positioned at an angle of approximately seventy degrees with respect to the vertical.

14. A method of creating an optical overlay, the method comprising the steps of:
   a) forming a four-sided ring of a material wherein each side includes an inner wall, an outer wall, an upper wall, and a lower wall;
   b) forming the inner wall to have a generally planar surface;
   c) forming the outer wall to have a generally convex surface, such that the outer wall in combination with the inner wall form a plano-convex lens;
   d) forming a first plurality of ridges on the upper wall that are generally parallel to the inner wall; and
   e) forming a second plurality of ridges on the lower wall that are generally parallel to the inner wall, such that the second plurality of ridges in combination with the first plurality of ridges form an optical filter;
   wherein each ridge includes an angled forward surface facing the inner wall and an angled rear surface facing the outer wall; and
   wherein the ridges are formed such that radiation that enters the optical overlay through the inner wall with a non-zero angle of incidence is reflected off of the forward surface and the rear surface.

15. The method of claim 14, further including the step of applying a coating to the upper wall and the lower wall to scatter and/or absorb radiation that contacts the optical filter.

16. The method of claim 14, wherein the material is transmissive to radiation with wavelengths ranging from approximately 870 nanometers to approximately 1050 nanometers.

* * * * *